No. 607,030. Patented July 12, 1898.
A. W. FUNK.
AUTOMATIC BRAKE AND SAFETY GUARD FOR VEHICLES.
(Application filed Feb. 12, 1897.)
(No Model.) 2 Sheets—Sheet 1.
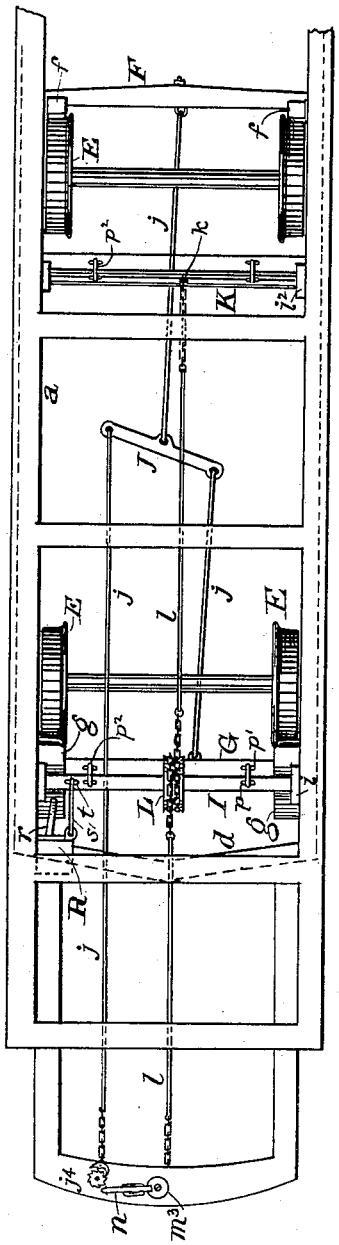
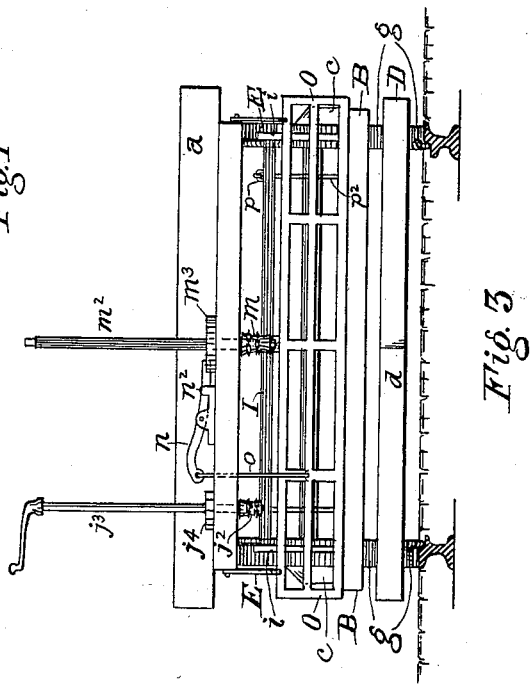
WITNESSES
H. B. Cavanaugh
M. B. Vorce.
INVENTOR
Alexander W. Funk
by C. M. Vorce
Attorney.

No. 607,030. Patented July 12, 1898.
A. W. FUNK.
AUTOMATIC BRAKE AND SAFETY GUARD FOR VEHICLES.
(Application filed Feb. 12, 1897.)
(No Model.) 2 Sheets—Sheet 2.
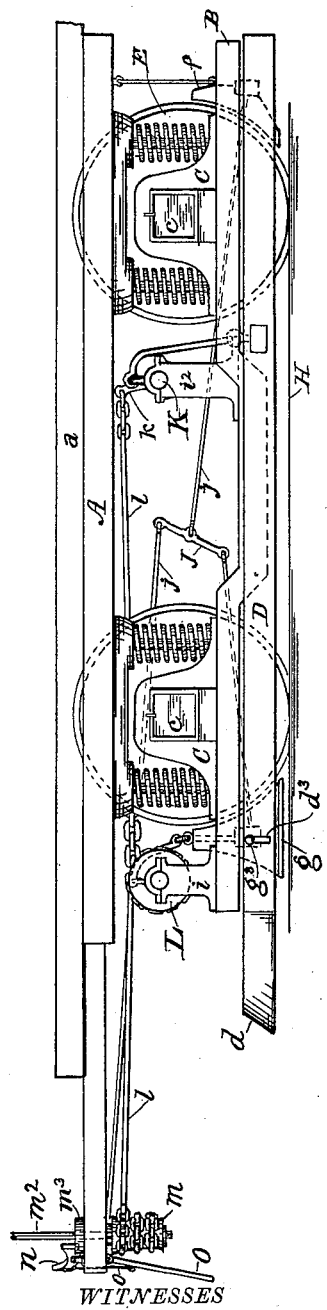
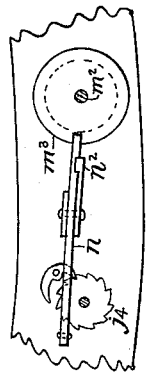
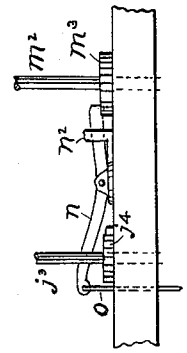
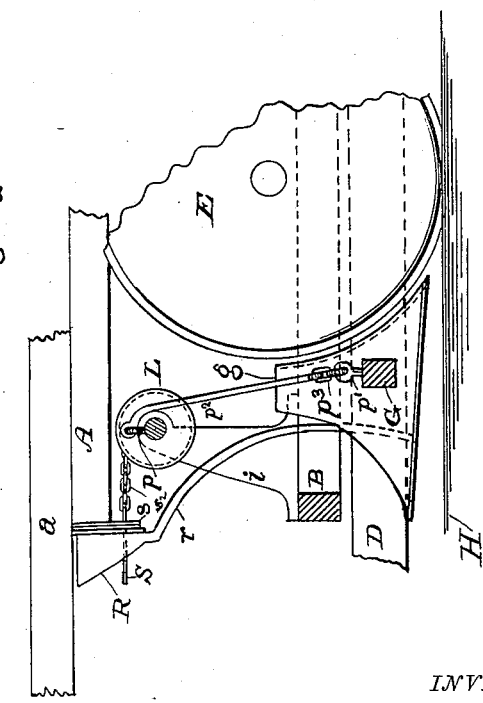
WITNESSES
INVENTOR

United States Patent Office.

ALEXANDER W. FUNK, OF CLEVELAND, OHIO, ASSIGNOR OF ONE-HALF TO WILLIAM E. SAUNDERS, OF SAME PLACE.

AUTOMATIC BRAKE AND SAFETY-GUARD FOR VEHICLES.

SPECIFICATION forming part of Letters Patent No. 607,030, dated July 12, 1898.

Application filed February 12, 1897. Serial No. 623,085. (No model.)

*To all whom it may concern:*

Be it known that I, ALEXANDER W. FUNK, a citizen of the United States, residing at Cleveland, in the county of Cuyahoga and State of Ohio, have invented certain new and useful Improvements in Automatic Brakes and Safety-Guards for Vehicles; and I do hereby declare the following to be a full, clear, and exact description of the invention, such as will enable others skilled in the art to which it appertains to make and use the same.

My invention relates to apparatus for preventing injury or loss of life from accidents in the use of vehicles, being especially designed for use on motor-cars operating in streets, but not necessarily confined to such uses, as it is of much more general application and may be applied to horseless carriages and other vehicles.

The object of the invention is especially to protect pedestrians from injury by rapidly-moving vehicles, whether on fixed tracks or not; but it is also effective and useful for protecting the occupants of vehicles from injury by collision or other accidents, as from railway-trains, motor-cars, obstructions, or open drawbridges, &c.

The invention consists in the combination, construction, and arrangement of parts coöperating to effect the foregoing objects, as hereinafter fully described, and specifically pointed out in the claims.

In the drawings my invention is shown as applied to a street-car, from which its application to other vehicles will be readily understood.

Figure 1 represents a plan view of the sill-frame of a motor-car upon the car-truck having my invention applied thereto, the motors and electrical connections being omitted for greater clearness. Fig. 2 is a side elevation, partly broken away, of the same parts shown in Fig. 1. Fig. 3 is an end view of the same. Fig. 4 is a detached view, partly in section, showing the connection of the brake-shoes and dropping device. Fig. 5 is a detached plan view of the winding device and latch. Fig. 6 is a view of the same in elevation.

A represent the top chord of the car-truck, on which rests the sill-frame $a$ of the car-body.

B is the side bar of the axle-box frame, attached to and depending from the yoke C, which rests upon the axle-boxes $c$ in the usual way.

D is the guard-frame, surrounding the wheels E and having the usual angular inclined front end $d$. This guard-frame is generally required by law or ordinance to be attached to motor-cars and is usually rigidly attached to the car or truck and elevated some inches from the ground to prevent it from scraping on the ground when the car rocks, as it often will on a rough track; but in my device it is not rigidly or directly attached to the truck, but is suspended from a shaft carried by the truck in a manner to be presently described. On other vehicles than street-cars it need not entirely surround the wheels, but may merely extend across in front of the wheels.

F is the rear brake-beam, carrying brake-shoes $ff$ of the ordinary kind. G is the forward brake-beam, carrying at each end a shoe $g$ of approximately triangular form and having one side conforming to the periphery of the wheel and its under side a counterpart of the track H. The rear brake is suspended from the car-truck in the usual way; but the forward brake-beam G is suspended from a shaft I, journaled in suitable bearings, as $i$, on the axle-box frame, as seen most clearly in Fig. 4. The brake-beams are connected in the usual manner, as by rods or chains $jj$, to the usual brake-lever J and the usual spool $j^2$, having ratchet and dog $j^4$, and thus constitute an ordinary hand-brake, which when the shaft I is in the suspended position, as shown in full lines in Fig. 4, is operated by the brake-handle $j^3$ in the usual and ordinary manner of a hand-brake and with the ordinary effect. A shaft K, similar to I, is similarly supported back of the middle of the truck, as in bearings $i^2$, and the guard-frame D is supported therefrom in a manner similar to that in which the brake-beam G is supported from shaft I. A grooved pulley L is affixed rigidly to shaft I, and a cord or chain $l$ is secured to an eye or short arm $k$, rigid with shaft K, and passing thence to and once at least around pulley L is wound upon a spool $m$, carried on a shaft $m^2$, fixed at the front of the forward platform just within the "dashboard" of the car.

Depending beneath the front of the forward platform is an apron O, which may be of wood or metal, such as a wire grating or similar structure, but to be both light and strong. The apron O is hinged or suspended so as to swing freely and extends to within a few inches of the ground. A cord or chain $o$ is attached to the apron and carried to one end of a lever $n$, which is secured to the car-platform, and at its other end engages a notch in a disk $m^3$, rigidly attached to the shaft $m^2$.

By winding up the cord or chain $l$ on the spool $m$ the shafts I and K are turned so as to lift the forward brake-beam and the guard-frame D, which is connected to the brake-shoes $g$ by means of pins or bolts $g^3$ on the latter passing through slots $d^3$ on the guard-frame. When the shafts I and K are brought to the position shown in Fig. 4, in which the eye $p$ and arm $k$ are nearly vertical, but slightly back of the vertical position, the lever $n$ is forced into engagement with the notch in disk $m^3$, which has the effect of raising the other end of the lever, and thereby slightly raises the apron O, which is held in the raised position by the weight of the brake and guard-frame on the chain $l$ tending to unwind the spool $m$. The lever $n$ thus acts as a latch to hold the brake and guard-frame suspended.

To prevent accidental disengagement of the latch $n$ by jolting of the car or other causes without the apron O being struck and also to avoid the derangement of the latch and strain on its pivots by the constant pull of disk $m^3$ on the latch, I provide a catch $n^2$, (shown in Figs. 5 and 6,) which bears against the forward side of the latch, and being slightly inclined or bent so as to partially overlap above the latch exercises some retaining force on the latch and increases the force required to free it from disk $m^3$. By this means the latch is rendered secure against any pull on the cord $o$, caused by jolting, &c., but yields instantly to the pull caused by an actual blow on the apron O or to the pressure of the foot on lever $n$.

The safety device is now "set," and should a person walking or a body lying in front of the car be struck the apron will be forced backward, thereby pulling down the cord $o$ and freeing lever $n$ from engagement with disk $m^3$, whereupon the spool $m$ will instantly unwind and the brake-beam G and guard-frame D will fall, shoes $g$ $g$ resting upon the ground or track and the frame D within an inch or two of the ground. As soon as the shoes $g$ touch the rail upon which they fall the wheel will ride upon the shoe and a most effective track-brake is produced, stopping the car almost instantly. The instant dropping of the guard-frame when the apron is struck prevents the body from passing under the guard and getting under the wheels, as has often occurred where the guard-frame is fixed upon the truck in the usual way.

Any of the usual fenders of the scoop class may be used in connection with the above-described apparatus. Those which are operated by a tripping device merely need to have the apron O substituted for the special tripping apparatus employed therein, and those which act independently of a tripping device may simply be attached between the apron O and the guard-frame, the parts herein described continuing to perform the functions above set forth in either case.

The apparatus hereinabove described is not dependent for its action upon the contact of any body with the apron, but may be operated by the motorman or driver by simply pressing on lever $n$ with his foot, when the brake and guard-frame will be dropped by the releasing of the disk $m^3$ as the lever is disengaged. In this manner a vehicle thus equipped can be almost instantly stopped—as, for instance, to avoid a threatened collision with other vehicles or to avoid striking obstructions, pedestrians, &c.

A feature of advantage pertaining to my invention is that the brake and guard-frame can be raised into their usual places and set again by the motorman or driver without leaving the car by applying a handle to the shaft $m^2$, whereas in other tripping safety devices they require to be reset from the ground and cannot be reset from the platform The connection between the shaft I and brake-beam G and between shaft K and the guard-frame D is preferably by means of eyes $p$ $p$ on the shafts and corresponding eyes $p'$ on the beam and frame, curved links $p^2$, which engage the eyes $p$, and links or a short chain $p^3$, which flexibly connect the curved link with the eyes $p'$. The object of this construction is that when the shafts I and K are turned so as to suspend the brake-beam and guard-frame in the set position the eye $p$ stands nearly vertical or slightly inclined backward and the link $p^2$ drawn nearly in line with the support of the shaft, and thus exerts but little pull on the shaft, yet enough to cause it to turn instantly when the disk $m^3$ is released. The cord or chain I is preferably composed of rods joined by chains where connected to arm $k$ and where it passes around pulley L and spool $m$.

To increase the traction of the shoes $g$ on the track and prevent "skidding" of the car or other vehicle, a sand-box R may be attached to the truck and a hose or pipe $r$ led therefrom to discharge sand in front of or preferably beneath the shoe, as seen in Fig. 4, a slide S being connected by a rod $s'$, as shown in Fig. 1, or a chain $s^2$, as shown in Fig. 4, to eyes or arms $t$ on shaft I, as shown, so that as the shaft revolves to drop the brake-shoes and guard-frame the slide S will be drawn and sand will be discharged on the track. For this purpose an opening or channel is made in the shoe $g$, extending from the bottom of the shoe part or all of the way to the top thereof, and to the upper end of such channel the flexible pipe $r$ is connected, as seen in Fig. 4. The sand is thus dropped exactly at the point where it is to act, and none of it is wasted by falling beside the rail, as some of it might be if discharged in front of the shoe, which, however, is also within my invention. The slide S may be arranged to close by a spring *s* or by the direct action of its connection to shaft I, as preferred. It is to be understood that the sand-box is not an essential feature, but merely an auxiliary device acting in conjunction with the essential and novel feature of my invention and which may be dispensed with, if desired, without affecting my invention.

What I claim, and desire to secure by Letters Patent, is—

1. The combination with a vehicle of a brake having shoes adapted to act as wheel-brakes or as track-brakes, a shaft from which the brake is suspended, an arm or drum on said shaft, a guard or fender posteriorly suspended and extending before the wheels and supported anteriorly on said brake-shoes, a chain suspending said brake from said shaft, a chain secured to said drum and to a winding-spool, a latch engaging said spool and retaining it in the wound-up position, and means for tripping said latch to drop the brake and guard, substantially as described.

2. The combination with a vehicle of a brake having shoes adapted to act as wheel-brakes or as track-brakes, a shaft from which the brake is suspended, an arm or drum on said shaft, a guard or fender extending before the wheels and suspended at its rear part from a shaft and intermediately upon said brake-shoes, a chain attached to said shafts and secured to a winding-spool, a latch retaining said spool in the wound-up position, and means for tripping said latch to drop the brake and guard, substantially as described.

3. The combination, with a vehicle, of a brake having shoes adapted to act as a track-brake, a shaft from which the brake is suspended, an arm or drum on said shaft, a guard or fender extending before the wheels and supported at its rear part by a shaft and intermediately by the brake-shoes, a chain attached to said shafts and secured to a winding-spool, a latch retaining said spool in the wound-up position, and an apron depending from the front of the vehicle and connected to said latch for tripping the same, substantially as described.

4. The combination with a vehicle, of a brake having shoes adapted to act as a track-brake, a rotatable shaft from which the brake is suspended, a guard extending before the wheels, a rotatable shaft from which said guard is suspended, a cord or chain secured to said shafts and acting to rotate the same, a spool on which said chain winds, a latch retaining said spool in the wound-up position, and means substantially as described for tripping said latch to drop the brake and frame.

5. The combination with a vehicle of a brake having shoes adapted to act as wheel-brakes or as track-brakes, a shaft from which the brake is suspended, an arm or drum on said shaft, a guard or fender extending before the wheels and suspended at its rear part from a shaft and intermediately upon said brake-shoes, a chain attached to said rear shaft and to said arm or drum and secured to a winding-spool, a latch retaining said spool in the wound-up position, and an apron depending from the front of the vehicle and connected to said latch, substantially as described.

6. The combination with the brake mechanism of a vehicle, of the shoes adapted to act as a wheel-brake and a track-brake, a shaft from which the brake-beam carrying the track-shoes is suspended, a pulley on said shaft, a shaft carrying a winding-spool and a notched disk, a chain secured to said spool and rotating said pulley and shaft to suspend the brake, a latch engaging said notched disk, and a swinging apron connected to said latch for tripping the same, substantially as described.

7. The combination with the brake mechanism, of the shoes adapted to act as a wheel-brake and a track-brake, a shaft from which the brake-beam carrying the track-shoes is suspended, a pulley on said shaft, a guard extending before the wheels, a rock-shaft from which said guard is suspended, a shaft carrying a winding-spool and a notched disk, a chain secured to said rock-shaft and said spool and passing around said pulley, a latch engaging said notched disk, and a swinging apron connected to said latch, whereby the latch is tripped when the apron is swung and the brake and guard are simultaneously dropped, substantially as described.

8. The combination with a vehicle of a brake having shoes adapted to act as track-brakes, a shaft from which said shoes are suspended, a chain attached to said shaft and to a winding-spool, a latch retaining said spool in the wound-up position, a sand-box discharging immediately beneath said brake-shoe and having a valve or cut-off connected to said shaft, and means for tripping said latch, whereby the brake is dropped and the sand-box opened simultaneously, substantially as described.

9. The combination with a vehicle of a brake having shoes adapted to act as track-brakes, a shaft from which said shoes are suspended, a chain attached to said shaft and to a winding-spool, a latch retaining said spool in the wound-up position, a sand-box discharging immediately beneath said brake-shoe and having a valve or cut-off connected to said shaft, and a depending apron connected to said latch for tripping the same, substantially as set forth.

10. The combination with a vehicle of a brake having shoes adapted to act as track-brakes, a shaft from which said shoes are suspended, a chain attached to said shaft and to a winding-spool, a notched disk rigid with said spool, a latch engaging said disk and retaining the spool in the wound-up position, a sand-box discharging immediately beneath said brake-shoe and having a valve or cut-off connected to said shaft, and a depending apron connected to said latch for tripping the same, substantially as set forth.

In testimony whereof I hereto affix my signature in presence of two witnesses.

ALEXANDER W. FUNK.

Witnesses:
H. B. CAVANAUGH,
JOHN N. WYLER.